Figure 1:
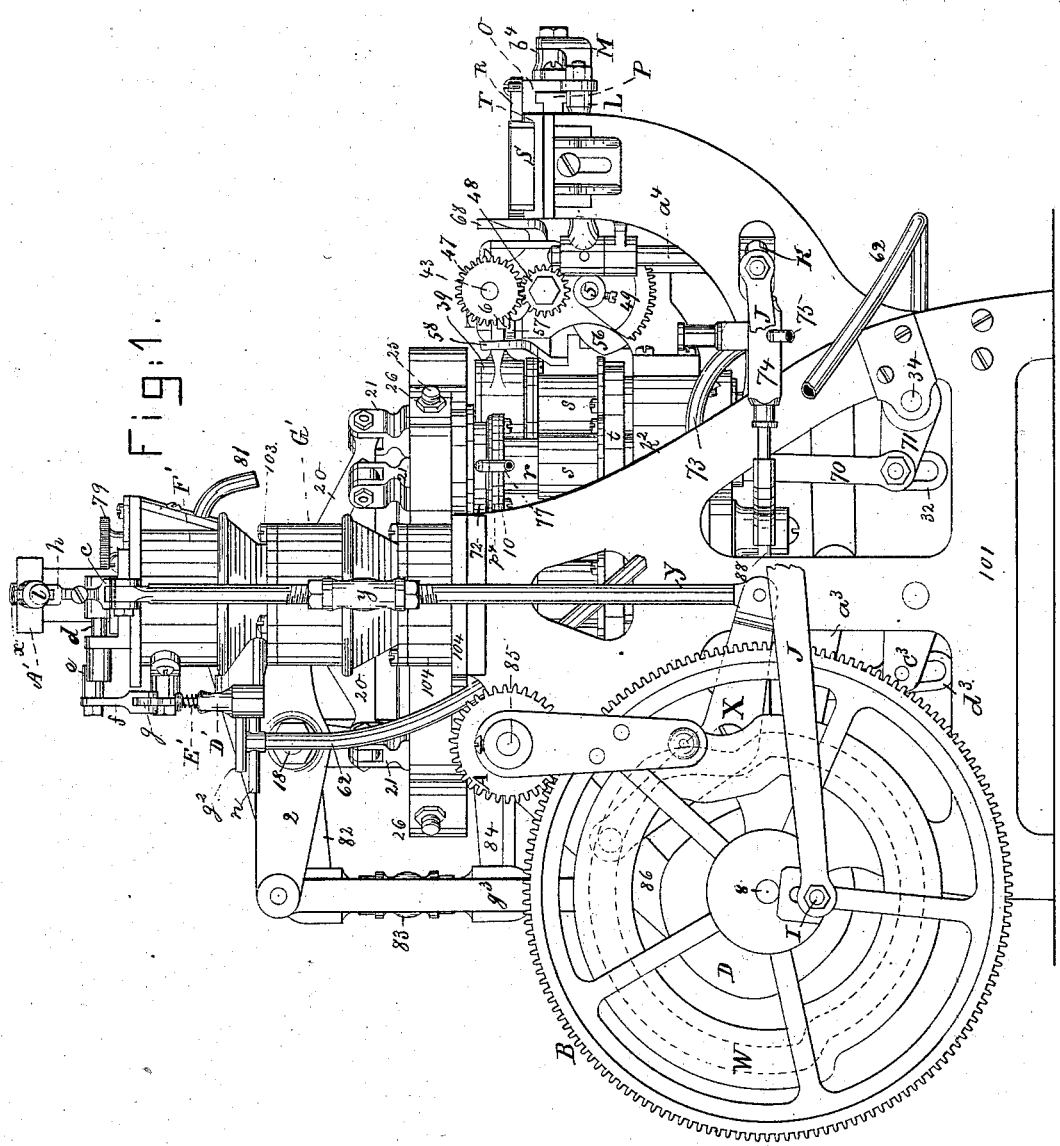

(No Model.)  W. J. KEEFE.  6 Sheets—Sheet 1.
PAPER BOX MACHINE.

No. 254,826.  Patented Mar. 14, 1882.

Witnesses.  Inventor.
Jos. P. Livermore  Wm. J. Keefe
Laurence F. Connor  by Crosby & Gregory
 Attys.

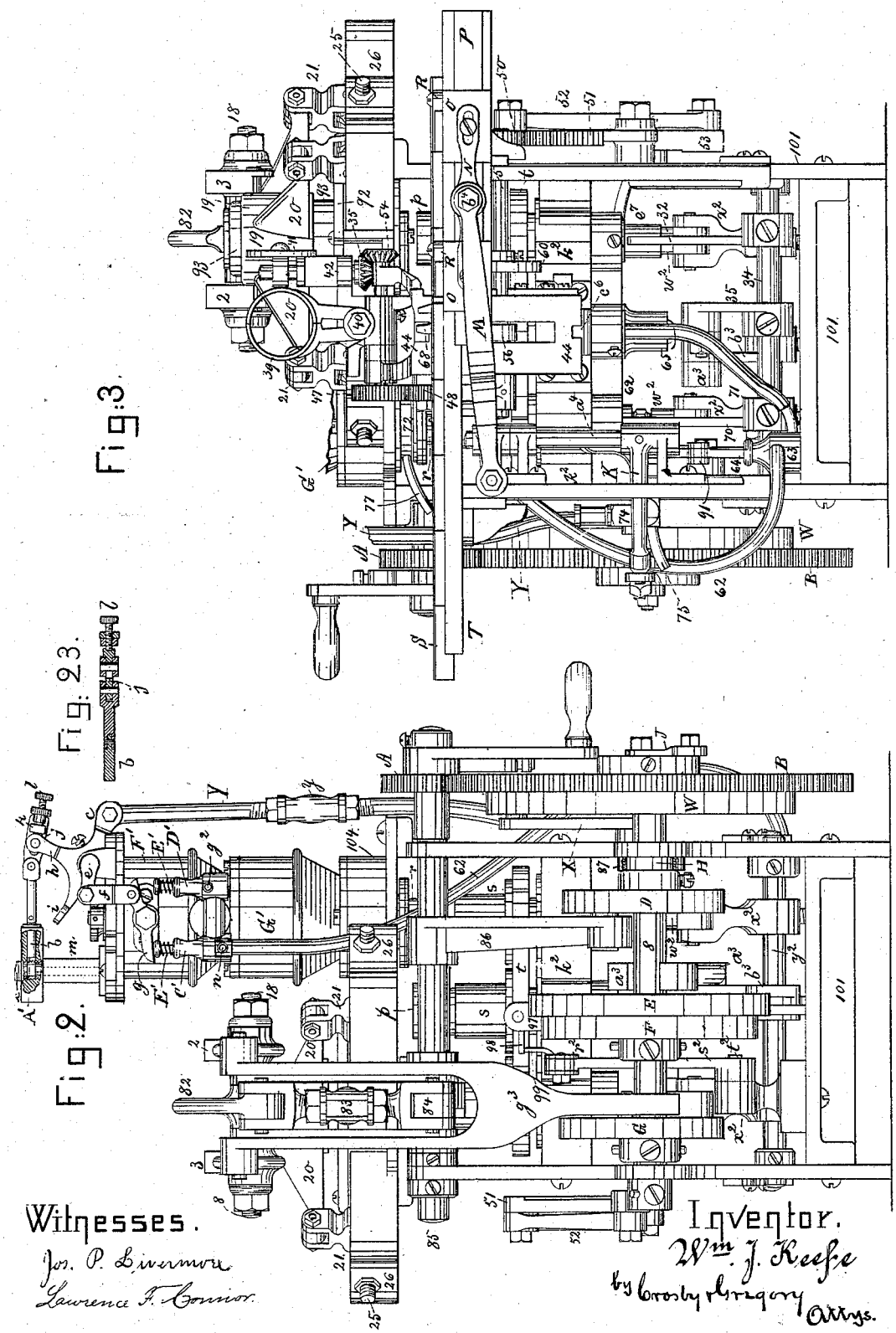

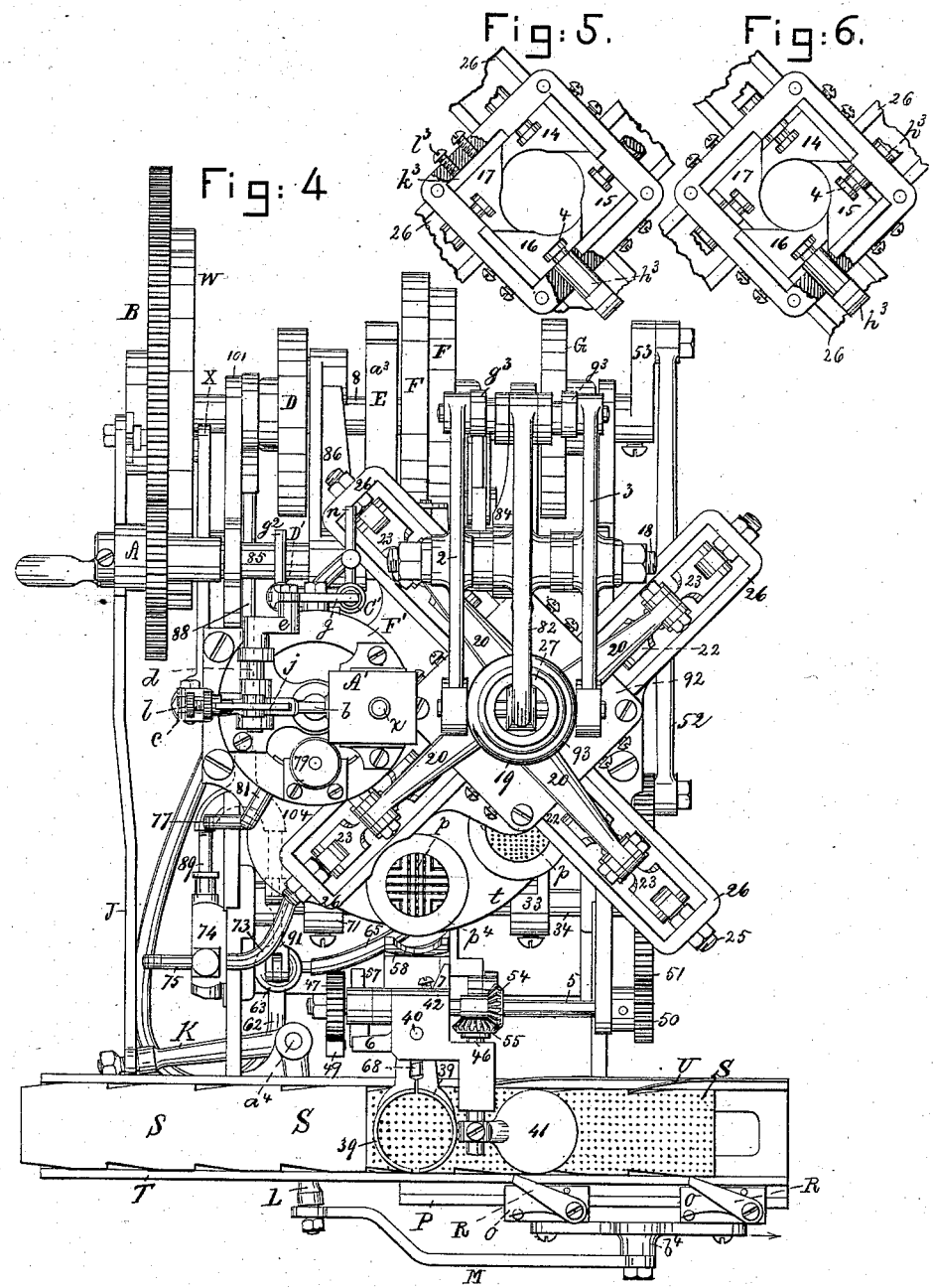

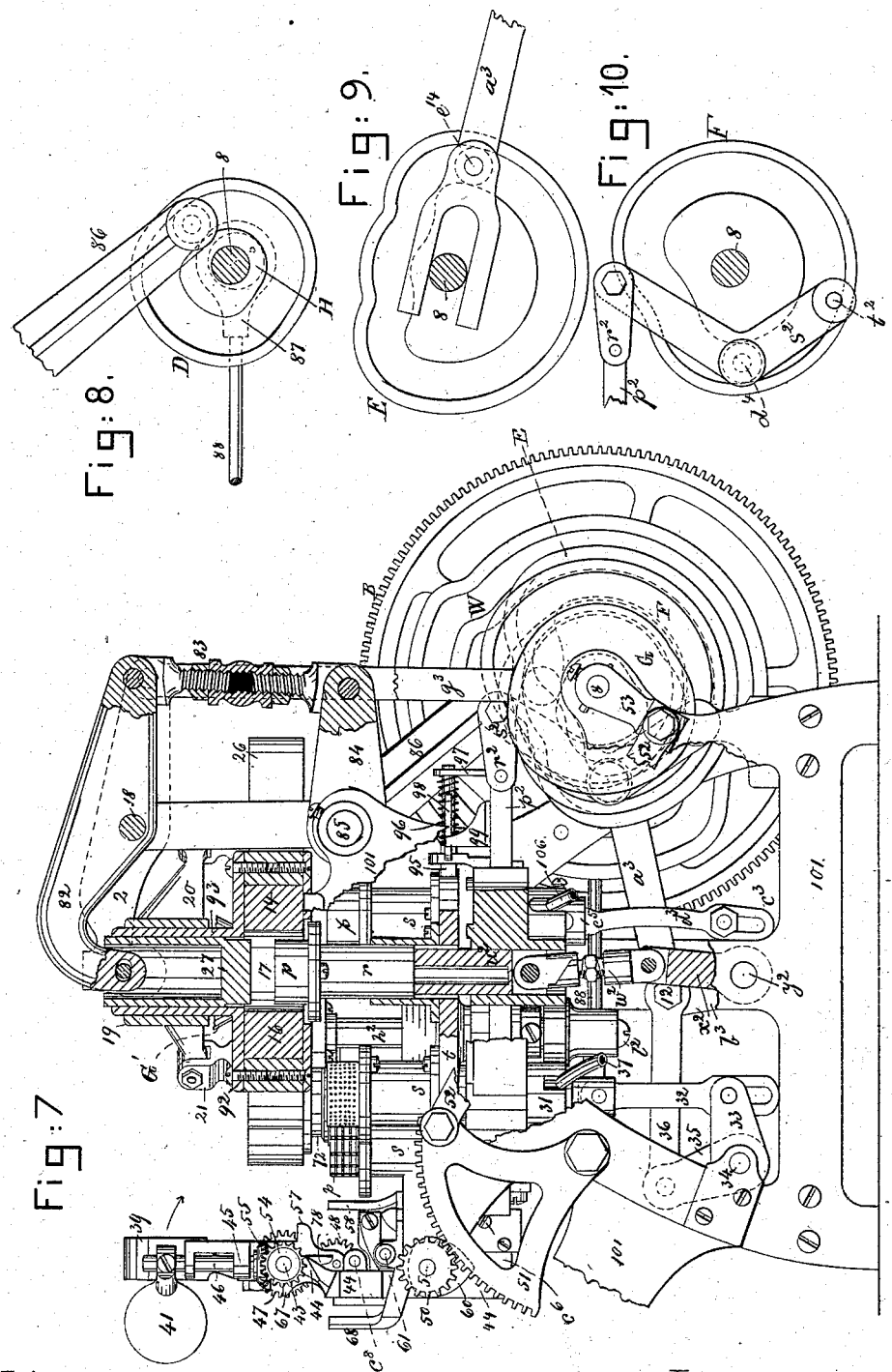

(No Model.) 6 Sheets—Sheet 5.
W. J. KEEFE.
PAPER BOX MACHINE.
No. 254,826. Patented Mar. 14, 1882.
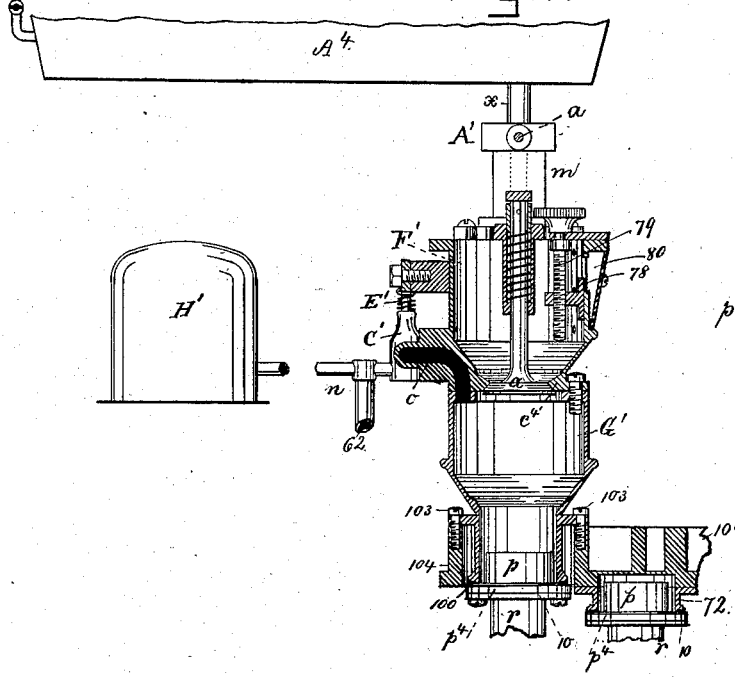
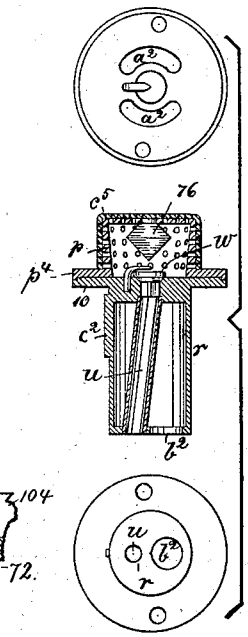
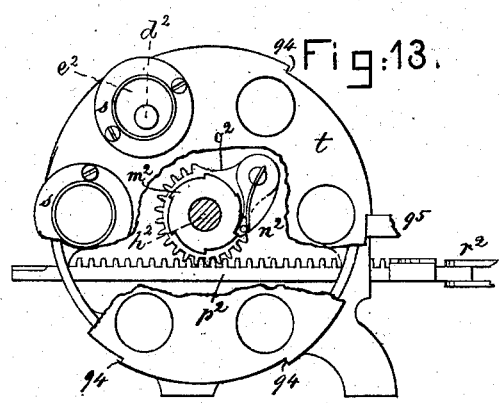
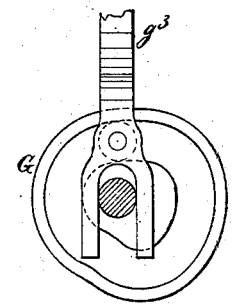
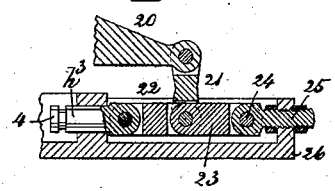
Witnesses.
Lawrence F. Connor
Jos. P. Livermore
Inventor.
Wm. J. Keefe
by Crosby Gregory Attys (No Model.)  6 Sheets—Sheet 6.
W. J. KEEFE.
PAPER BOX MACHINE.
No. 254,826.  Patented Mar. 14, 1882.
Fig. 20.
Fig. 16.
Fig. 21.
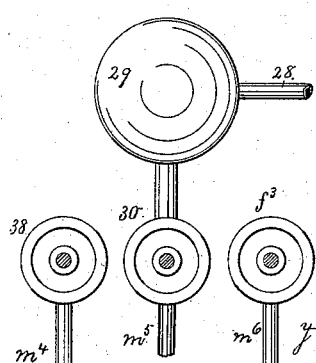
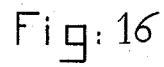
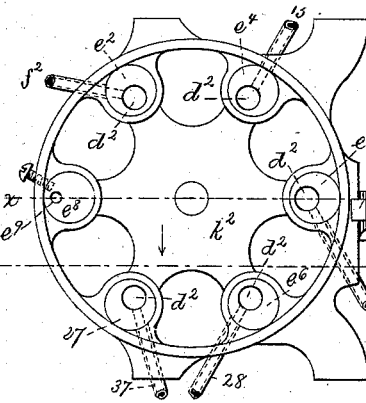
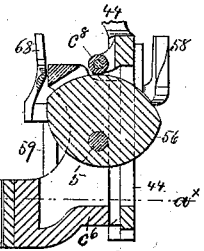
Fig. 19.
Fig. 26.
Fig. 17.
Fig. 22.
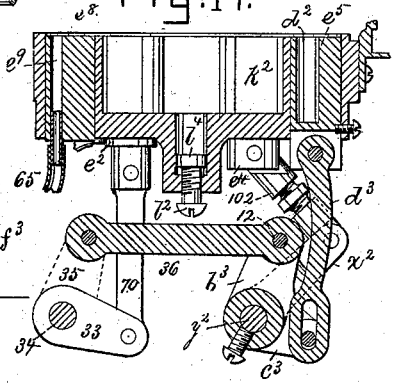
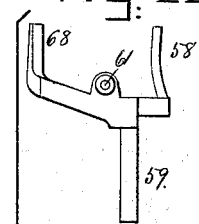
Fig. 24.
Fig. 18.
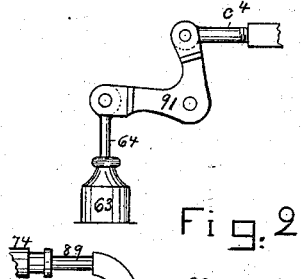
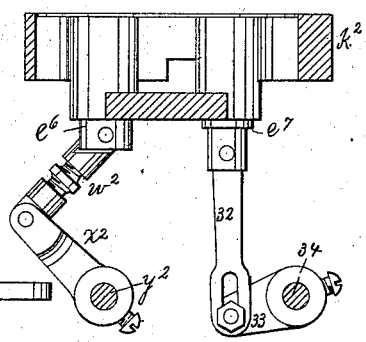
Fig. 25.
Witnesses.
Laurence F. Connor
Jos. P. Livermore
Inventor.
Wm. J. Keefe
by Crosby & Gregory Attys.

UNITED STATES PATENT OFFICE.

WILLIAM J. KEEFE, OF BOSTON, MASSACHUSETTS.

PAPER-BOX MACHINE.

SPECIFICATION forming part of Letters Patent No. 254,826, dated March 14, 1882.

Application filed May 6, 1880. (No model.)

*To all whom it may concern:*

Be it known that I, WILLIAM J. KEEFE, of Boston, county of Suffolk, State of Massachusetts, have invented an Improvement in Paper-Box Machines, of which the following description, in connection with the accompanying drawings, is a specification.

This invention relates to an improved machine for manufacturing hollow paper articles directly from the pulp, and is especially adapted for the rapid and economic manufacture of paper boxes and other similar shells.

In this my invention I prefer to and have shown apparatus by which to use the so-called "high column" of thin pulp, particularly described and claimed in United States Patent No. 84,535, as employed to deposit the pulp upon the pervious former. The hollow pulp article having been formed, the former is withdrawn from the forming-cylinder and automatically carried into position over a suction-chamber connected by a pipe with a suction-pump to thus remove much of the water in the layer of pulp upon it. Then the former is further moved into position to be placed between the compressing-dies, which express the moisture from the hollow article, compact it upon the former, and give definite shape or outline to its external surface. The water expressed in this way is carried from the former through a suitable pipe connected with a vacuum-chamber created by a suitable exhausting pump or apparatus. Then the former is moved preferably into position over a second suction-chamber, substantially like the first one referred to, when any water left adhering to the inner portion of the pervious former or to the hollow article is removed. Then the former is moved into position to permit the pressed hollow article to have applied to it the taking-off cap, which, as it first surrounds, incloses but does not touch the sides of the said article. Then air under pressure is admitted within the former to thereby expand the hollow article sufficiently to detach its inner sides from the pervious face or covering of the former, this operation also causing the outer portion of the hollow article to be placed in contact with the taking-off cap both at its sides and bottom. As the air is expelled from the interior of the said cap by the expansion of the hollow article a contact is made which is sufficiently adhesive to insure the retention of the hollow article in the cap as it is elevated, the cap thus removing the hollow article from the former. The cap is then revolved, opened, and made to deliver the hollow article upon a proper receiver, preferably either a traveling bed or belt, to be dried and finished in any proper way. The hollow article having been removed from the former the former is moved into position under and placed in a hood, after which a stream or jet of water is forced upward within the former by a forcing-pump or supply of water under pressure to thoroughly wash the former and remove from it all adhering pulp, and then the former is again moved to its first position under the forcing-cylinder, to be lifted into it to receive a new supply of pulp. The pulp from the pulp-vat is led into the pulp-receiver, a sufficient quantity at each time for the article to be made, and from this receiver the pulp is discharged through a valve into the forming-cylinder, after which air under pressure of from one to three atmospheres is admitted into the closed forming-cylinder above the high column of thin pulp, the said air forcing the pulp and water down and the water through the pervious former to its opposite or interior face, leaving the pulp upon its outside. The introduction of compressed air, as described, reduces the temperature of the water containing the pulp to such a degree that the water does not readily pass from the pulp; but I have discovered from experiment that this difficulty may be obviated by heating the pulp preparatory to its introduction into the forming-cylinder, and I am thus enabled to employ air-pressure upon the surface of thin pulp and yet work rapidly. Heating the pulp in this way is a most essential step or operation in this my process, as by it I am enabled to greatly increase the speed of production of the said hollow articles.

United States Patent No. 202,353, heretofore granted to me, to which reference may be had, shows and describes dies substantially like those herein described to retain the hollow article in position externally while being expanded and pressed from its inner side by the expansion of an india-rubber bag. In practice the pulp-supplying portion or vat will be elevated above the level of the vat-valve and pulp-receiver, so as to permit the pulp to flow to and through the said valve. The pulp-controlling valve seats itself in an upward direction, thus enabling the action of the compressed air admitted within the forming-cylinder to hold the said valve closely against its seat.

My invention consists in a pulp-receiver and forming-cylinder, combined with an intermediate pulp-controlling valve to permit the intermitting discharge of pulp from the receiving into the forming cylinder, substantially as hereinafter described; also, in a pulp-vat, a receiving-cylinder, and a forming-cylinder, combined with a vat-valve located between the pulp-vat and receiving-cylinder, and with a pulp-controlling valve between the receiving and forming cylinders, substantially as hereinafter set forth; also, in a pulp-receiving cylinder, provided with an adjustable overflow-gate to prevent the accumulation in the receiver of more pulp than needed for the article to be produced; also, in a pulp-receiver and forming-cylinder, combined with an automatically-operated pulp-controlling valve to permit the discharge of pulp from the receiver into the forming-cylinder, and then close the opening between the said parts; also, in a pulp-receiving cylinder, a forming-cylinder, and a pervious former adapted to be placed therein, and the pulp-controlling valve between them, combined with suitable pipes and valves to introduce compressed air into the forming-cylinder to force the water of the pulp through the pervious former; also, in a forming-cylinder and pulp-controlling valve to close it, and a pervious former, combined with a port and inlet and outlet valves for the passage of compressed air, substantially as hereinafter described; also, in a forming-cylinder largest in diameter at its upper end, and tapered to join with a cylindrical portion of smaller diameter at its lower end, combined with a pervious former of less diameter and length than that portion of the forming-cylinder which is made cylindrical, and is of least diameter, as hereinafter set forth; also, in a stationary or fixed forming-cylinder, having a valve for the admission therein of compressed air, when co-operating with a table, and means to operate it intermittingly, a series of formers carried thereby, and with means to successively place the said formers and the lower portion of the forming-cylinder in proper contact and relation to enable the formers to successively receive upon them a deposit of pulp; also, in a pervious former provided with a hollow stem for the passage of both air and water; also, in a pervious former provided with a hollow stem, combined with an air-pipe and a valve to act as a stop for the same, substantially as hereinafter described; also, in a pervious former provided with a hollow stem and outlet, combined with a hollow reciprocating plunger to elevate the said former and make connection between its stem and the plunger to enable water within the pervious former to be delivered outward through the plunger; also, in a pervious former and means to elevate it within the space between the compressing-dies, combined with the compressing-dies and means to close them to express the water from and compact the pulp on the sides of the said former; also, in a pervious former provided with a hollow stem, combined with a pipe connecting the interior of the former with an exhaust-pump or vacuum-chamber to remove fluid from the inside of the former and box thereon; also, in a pervious former, a series of radially-movable pressing-dies, a die box to contain them, combined with a plunger and a sleeve in which it moves, and with means to exhaust the water from the interior of the former as it is expressed from the fiber on the said former; also, in a pervious former and hood to cover it, combined with a pipe to lead water under pressure to and discharge it within, and to cleanse the said former of pulp; also, in a pervious former, receiving-bed for the boxes, and the two concaved jaws of the taking-off cap, combined with means to move the jaws into position above the former and then above the bed, and with means to lower and raise the said jaws in each of their two positions and open and close them at proper times to take the box from the former and transfer it to the receiving-bed; also, in a paper-box-making machine, a taking-off cap composed of two concaved jaws and a cover, as hereinafter described; also, in that improvement in the art of making paper boxes from pulp, which consists in heating the pulp before it is delivered into the forming-cylinder to be acted upon by compressed air, which forces the water in the pulp through the interstices of the former, whereby the flow of the water from the fiber of the pulp and through the former is not retarded by coagulation due to the cooling action of the compressed air; also, in other features and mechanical organizations, hereinafter described, and specified at the end of this specification.

Figure I is a left-hand side elevation of a machine containing my improvements; Fig. 2, a rear end elevation thereof; Fig. 3, a front view; Fig. 4, a top view; Figs. 5 and 6, details of the pressing-dies in their expanded and contracted positions; Fig. 7, a partial right-hand side elevation and vertical section, the box in which the pressing-dies move, part of the rotatory table and table-bed being broken out to more clearly show the working parts. Figs. 8, 9, and 10 represent details of some of the cams, hereinafter described, and the levers moved by them. Fig. 11 is a vertical sectional detail of the pulp-receiver and forming-cylinder, showing a former in position to receive pulp and a former in position to be washed, the pulp-controlling valve in the receiver being in elevation. The said figure also shows a receiver to contain compressed air to enter the forming-cylinder and also part of the pulp-vat. Fig. 12 represents a top view, vertical section, and bottom view of one of the complete formers removed from the machine. Fig.

13 is a top view of part of the rotating table, two of its sleeves, one of them containing a plunger, said figure, by breaking out the table, also showing the rack-and-pinion device by which the table is rotated, the axis carrying the said table being shown in section. Fig. 14 is a detail of the cam that actuates the devices to move the toggles attached to the dies. Fig. 15 is a detail of one of the toggle-levers for moving the pressing-dies. Fig. 16 is a detail showing the top of the plunger-bed, with its series of plungers for lifting the formers at the proper times, as hereinafter stated; Fig. 17, a section of the same on the dotted line $xx$, Fig. 16; Fig. 18, a section on the dotted line $yy$, looking at the same in the direction of the arrow, Fig. 16. Fig. 19 is an elevation of a series of pumps for exhausting the air and water from the former, and for creating a vacuum in a vacuum-chamber connected with that one of the plungers that raises the former into the compressing-dies. Fig. 20 is a top view of Fig. 19, the shaft and eccentrics being omitted. Fig. 21 is a detail showing in section the cam for lifting the slide that carries the taking-off cap, and also the fingers to open and close the jaws of the said taking-off cap; Fig. 22, details, in different positions, of the devices for opening and closing the said jaws; Fig. 23, a longitudinal section of the vat-valve and its attached link. Fig. 24 represents in side elevation the lever 91, to be referred to; Fig 25, the forked link for operating the forcing-pump, and lever 91 for moving the stem of the valves which at the proper time admits air under pressure within the former to detach the box from the pervious former before removing it. Fig. 26 is a section on the dotted line $a^4 a^4$, Fig. 21, to show the slide-frame and the T-shaped guide-head on which it slides.

The stationary frame-work 101 of the machine is of suitable shape to sustain the working parts. The small gear A on a shaft or stud, and suitably driven by a belt or otherwise, engages the toothed wheel B on and drives the cam-shaft 8, upon which are the cams D E F G and an eccentric, H. (Shown partially in Fig. 2, and in dotted lines, Fig. 8.) At one end of the shaft 8 is a crank-pin, I, that by a link, J, is connected with arm K of a vertical rockshaft, the other arm, L, of which is joined by a link, M, with a stud, $b^4$, on yoke N, slotted at its ends, (see Fig. 3,) and adjustably connected by screws with the blocks or slides O, mounted on the V-shaped guide-ledge P, each of the said slides having a spring-governed pawl, R, that engages notches at the edge of the receiving-bed S, (see Fig. 4,) upon which the hollow articles are delivered, as hereinafter described, the said bed being herein shown as a longitudinally-movable frame, and having preferably a pervious top, as shown at the right of the said Fig. 7; but, if desired, this bed may be a plain smooth surface, such as shown at the left-hand side of the said figure, or which may be an endless belt. This receiving-bed is moved between guideways of a frame, T, and is prevented from being moved backward by suitable detents, U, that engage notches at the sides of the bed. The adjustment between the yoke N and the pawl-carrying slides O is to adapt the movement of the bed to hollow articles of different sizes. Hereafter in this description, for brevity, I shall use the term "box" to distinguish the hollow article made from pulp. Attached to the inner side of the toothed wheel B is a cam, W, suitably shaped, as shown in Fig. 7, and in dotted outlines, Fig. 1, to operate through suitable connections the pulp-controlling valve $a$, (see Fig. 11,) and the vat-valve $b$ in the vat-valve box A′, and the air-inlet and exhaust valves C′ D′, they being slide-valves of usual construction, provided with springs E′ upon their stems, as shown in Figs. 2 and 11, to close them. The said cam W vibrates a lever, X, (see Fig. 1, partially in dotted lines,) connected with a pitman, Y, made adjustable by a threaded sleeve, $y$. This pitman is joined to an arm, $c$, (see Fig. 2,) of a rock-shaft, $d$, having at its opposite end an arm, $e$, connected by link $f$ with one end of the lever $g$, that strikes, when in one position, the stem of the air-inlet valve C′, and in its other position the stem of the air-outlet valve D′. This rocker-shaft also carries two other arms, $h$ $i$. The arm $h$ is connected with a slotted link, $j$, having within its slot a movable block, $k$, that by an adjusting-screw, $l$, may be moved to lengthen or shorten the throw of the valve $b$, connected with the said link, according as it is desired to permit more or less pulp to flow through the pulp-valve box A′ and the pulp-vat $A^4$ (see Fig. 11) into the pulp-receiver F′ during one revolution of the camshaft, or according to the size of the box to be made. This vat-valve $b$ is connected by suitable pipe, $x$, with the pulp vat $A^4$, in which the pulp is heated by a steam-coil, or by free steam admitted into the pulp; but said pulp may be heated in any other proper way. The vat-valve box A′ has below it a conductor, $m$, provided with a suitable passage, (see dotted lines, Figs. 2 and 11,) that leads the pulp into the pulp-receiver F′, at the time closed at its lower end by the pulp-controlling valve $a$, having upon its stem a spiral spring to lift it upward against the valve-seat $c^4$. The receiver F′ having received a suitable charge of the pulp, the shaft $d$ is moved to close the pulp-valve, and as the said shaft continues its movement in that direction lever $g$ is turned to open the air-outlet valve D′, and then the arm $i$ acts upon the stem of and opens the pulp-controlling valve $a$ and permits the measured quantity of pulp in the receiver to pass into the forming-cylinder G′.

The air-inlet valve C′ has at the rear of it a supply-pipe, $n$, which is in communication with a suitable tank or reservoir, H′, of proper size, the said tank, more or less remote therefrom, being supplied with compressed air of two or more atmospheres by any usual air-compressing apparatus, (not necessary to be herein shown, because not of my invention.) A reservoir of this kind is shown at H', Fig. 11; but no regard has been taken in the said figure to preserve regular proportions. The pulp—thin pulp, as described in the patent hereinbefore referred to—being discharged into the forming-cylinder G', a reverse movement of the rocker-shaft $d$ causes the free end of the lever $g$ to descend upon the stem of the air-inlet valve C', as shown in Fig. 2, thus opening the said valve to permit compressed air held in the reservoir H' to pass through the pipe $n$ and valve C' and port $o$ (see Fig. 11) into the forming-cylinder to therein act upon and force the water of the pulp through the pervious former $p$, then in the forming-cylinder, (see Fig. 11,) the pulp remaining evenly deposited or laid upon the said former. The formers $p$, in a working machine, will each be as represented in detail, Fig. 12, wherein the former is shown as a metal shell of suitable shape, perforated at its sides and top, and provided with an external metal cover having finer and more numerous perforations. The former has a flange, $p^4$, at its base to rest upon and be fastened to the flange 10 of a hollow stem, $r$, which is fitted into and adapted to be moved up and down in a sleeve, $s$, secured to the intermittingly-rotating table $t$, this table in practice having a number of such sleeves to receive the stems of a number of formers. The stems $r$ will each have a feather, $c^2$, to enter a suitable groove in its sleeve to prevent rotation of the stem. As herein shown, the said table is provided with six sleeves $s$, six formers being employed. Each former $p$ has in its stem $r$ an air-pipe, $u$, at the upper end of which is a puppet-valve, $w$, to prevent water passing through the former and stem entering the said air-pipe $u$. At each side of this valve $w$ are passages $a^2$, (see Fig. 12,) that permit the water within the former to enter the stem $r$, from which it escapes at the outlet $b^2$ into and through a corresponding port, $d^2$, in one of the series of plungers, $e^2$ $e^4$ $e^5$ $e^6$ $e^7$, (see Fig. 16,) each operated independently, as hereinafter described, to lift the stem and former then above it into the forming-cylinder, the pressing-dies, or whatever may be directly above the former at that time. The top of the plunger $e^4$ and the lower end of the stem $r$ above it are held in close contact during the operation of collecting or forcing the pulp upon the former in the forming-cylinder, as in Fig. 11, the water then passing through the former being forced through the port $d^2$ of the plunger $e^4$ by the compressed air in the forming-cylinder, from which it is discharged through a suitable pipe, 13. The plungers are properly guided in the plunger-bed $k^2$, which is fixed. The forming-cylinder (see Fig. 11) is connected by screws 103 with the table-bed 104, which is fixed with relation to frame-work 101. The compressed air, entering the forming-cylinder above the pulp, immediately expands, and in so doing, as will be obvious, chills the pulp, thus greatly checking and retarding the passage of the water through the fibrous part of the pulp as it is collected upon the former, and also through the holes in the former itself.

In my first experiments in connection with the manufacture of paper boxes it was decided that the liquid containing the pulp must, for practical work, be forced through the former as quickly as possible; but in doing so, with compressed air and with the pulp in its usual condition, it was found that boxes could not be produced sufficiently fast to be fully profitable, because of chilling the pulp in the forming-cylinder, as described. Having discovered this serious evil, I immediately began to devise a plan whereby to neutralize the effect of the expansion of the air, as described, in the forming-cylinder, so that the pulp might always be kept at a proper temperature to permit it to flow easily and readily through the fiber on the former and the former itself. The preferable plan for overcoming this difficulty is to heat the pulp in the pulp-vat just hot enough to neutralize the cooling effect of the expansion of the air. This may be done by the use of free steam or steam in a coil, or by the introduction of hot water into the pulp. During the time that the compressed air is active in the forming-cylinder, and while it acts in forcing the valve $a$ to its seat, the valve $b$ is opened to permit a fresh supply of pulp to enter the receiving-cylinder F'. The water in the pulp charged into the forming-cylinder having been forced through the former, the rocker-shaft $d$ in its next movement to close valve $b$, and before opening valve $a$, causes one end of the lever $g$ to act upon and open the air-outlet valve D', permitting the air in the forming-cylinder to pass out and be discharged through the pipe $g^2$. The pulp having been collected upon the former $p$ when in the position shown at the left of Fig. 11, the plunger $e$, before referred to, is lowered, permitting the former and its stem to drop until its flange 10 rests upon the top of the sleeve $s$, when the table $t$ is revolved one step. The table $t$ has a central axis or shaft, $h^2$, which is extended through an opening in the plunger-bed $k^2$, where it is adjustably supported at its lower end by means of a screw, $l^2$, and plate $l^4$, as shown in section, Fig. 17. This axis has upon it a ratchet, $m^2$, which is engaged by a pawl, $n^2$, pivoted upon a pinion-like pawl-carrier, $o^2$, loosely surrounding the said shaft and engaged by the teeth of the rack-bar $p^2$, connected by link $r^2$ with a lever, $s^2$, pivoted at $t^2$, the lever having a stud or roll, $d^4$, to enter the groove at the side of the cam F. (Shown in detail, Fig. 10.) The plungers $e^4$ and $e^6$ are each connected by an adjustable link, $w^2$, of usual construction, with the arm $b^3$ of the said rocker-shaft by the bolt 12, the outer end of the said link being formed, as shown at Fig. 9, to embrace the shaft 8, a stud or roll, $e^{14}$, on the said link entering the groove at the face of the cam E. This same rocker-shaft $y^2$ has an arm, $c^3$, (see Fig. 7, and detail, Fig. 17,) with which is connected the link $d^3$, that lifts the plunger $e^5$, provided, as in the case of the other plungers, with a suitable passage, $d^2$, to coincide with the outlet $b^2$ at the bottom of the former-stem $r$. This plunger $e^5$ has a pipe, 106, connected with a suction-pump, $f^3$, (shown separately in Figs. 19, 20,) the said suction-pump drawing through the said pipe and plunger any water which may remain in the pulp on the former after being removed from the forming-cylinder, after which operation the plunger $e^5$ is lowered, permitting the former $p$ to descend and the rotating table $t$ to be moved another step. The plungers act to lift the formers just far enough to remove the flanges 10 of the stems from the sleeves $s$, so as to insure contact between the foot of each stem and the top of the plunger. The table $t$ having been moved, the plunger $e^6$ is lifted by the devices before described, causing it to lift the stem $r$ and place the former $p$ between the pressing-dies 14 15 16 17. (Shown clearly in Figs. 5 and 6.) The former $p$, with the pulp-box upon it, is lifted between the said dies while they are held open, as in Fig. 5, and immediately thereafter the cam G (see Figs. 4 and 14) acts upon the forked link $g^3$, connected at its upper end with the two walking-beams 2 3, having their fulcra at 18, each of the said walking-beams, at its front end, being connected with the collar 19, having four arms, 20, each of which, as shown more clearly in Fig. 4, is joined by a link, 21, with a toggle-lever composed each of two parts, 22 23. The outward end of each toggle lever is connected by pin 24 with a screw, 25, adjustably held in position upon or at the outer end of one of the yokes 26. The inner end of each toggle-lever has connected with it a die-moving rod, $h^3$, having a head, 4, which enters a correspondingly shaped recess in one of the dies, 14, 15, &c. (See Figs. 5 and 6.) As this collar is lowered the toggle-levers are straightened and the said dies are made to assume the position shown in Fig. 6, compressing the pulp article firmly against the sides of the former, expressing the water from the pulp, and shaping and smoothing the article externally at its sides.

The box-plunger 27, connected with the walking-beams 82, has its fulcrum on the pin 18, and at its rear end is joined by the adjustable link or pitman 83 (shown in section, Fig. 7) with the arm 84 of the rocker-shaft 85, the said shaft having upon it another arm, 86, which is acted upon by the cam D. (Shown separately in Fig. 8.) Just after the dies 14, 15, &c., are closed, as described, the said box-plunger, or that device which presses the pulp deposited upon the top of the former, meets the pulp at the top of the former and compresses it, thus completing the pressing action for the formation of the box.

In practice it was found, when the dies and box-plunger were fully closed, as described, that the water could not be fully removed from the box; but the reason why the water was held by the box was discovered to be in the fact that above and surrounding the outer side of the box the air was entirely excluded from it, while at the inner side of the box there was sufficient atmospheric pressure to prevent the water from exuding from or leaving the pressed box. To overcome this difficulty the plunger $e^6$ has been provided with a pipe, 28, (see detail, Figs. 19 and 20,) and the said pipe has been connected with a vacuum-chamber, 29, the vacuum therein being formed by an exhaust-pump, 30. With this vacuum-connection the atmosphere below and within the former $p$ is quickly exhausted, taking with it much of the water of the box. The dies and box-plunger now recede, the former, with the pressed box upon it, is lowered, and the table $t$ is again moved another step, when the plunger $e^7$ is actuated by the link 32, connected with the arm 33 of the secondary rocker-shaft 34, having an arm, 35, connected by link 36 with the pin 12, before described as being joined with the arm $b^3$ of rocker-shaft $y^2$, the latter shaft thus moving the shaft 34. When this plunger $e^7$ is elevated it raises the former, as before described, from the top of the sleeve $s$, and by means of a pipe, 37, attached to the said plunger, and in communication with the suction-pump 38, (see Fig. 20,) the air is exhausted from the interior of the former, causing the removal of any water which, since the removal of the former and box from the compressing-dies, may have settled at the interior of the former. Each of these pumps $f^3$, 30, and 38 has a suitable outlet-pipe by which to discharge from it exhaust-water, or water and air. This operation performed, the plunger $e^7$ and the former above it are lowered and the table $t$ moved another step, bringing the former, with the box upon it, in position opposite the taking-off cap 39. In Figs. 3 and 7 this taking-off cap is shown in elevated position, and as being moved toward the box upon the former. This cap is composed of two concaved side jaws, 39, loosely mounted upon a pivot, 40, and a cover, 41. The pivot 40 is erected in a yoke, 42, connected with the shaft 43, having its bearings at the top of the slide 44. This yoke has suitable bearing-ears to receive the shaft 46, to which is attached the cover 41. The shaft 43 has upon it a pinion, 47, that is engaged with a pinion, 48, in turn moved by the toothed sector 49 (see Fig. 1) on the oscillating shaft 5, extended through to the opposite side of the machine, (see Fig. 7,) where it is provided with a pinion, 50, that in turn is engaged and moved first in one and then in the opposite direction by a toothed sector, 51, connected by link 52 with the crank 53 at the right end of the cam-shaft 8. The shaft 43 has at one end of it a bevel-gear, 54, that engages the bevel-gear 55 on the shaft 46, to which is attached the cover 41, and as the shaft 43 is turned from its forward to its backward position toward the box the bevel-gear 54 is made to engage and turn the shaft 46 to bring the cover 41 upon the jaws just as they arrive in true horizontal position above the box on the former, the jaws being then somewhat separated, the said jaws being maintained in horizontal position by reason of the finger 6, connected with the yoke, it then resting upon the projector 57. The slide 44, which is raised and lowered by the cam 56 on the shaft 5, is now turned to permit the jaws, held just above the box, to descend, the said jaws being sufficiently separated to pass down over the box without touching its sides; but as soon as the cover 41 bears upon that part of the box at the top of the former, and the lower edges of the jaws rest upon the flange of the former, a jaw-closing device, 58, made as a fork attached to a slide-bar, 59, (see detail, Fig. 22,) is lifted, causing the two members or prongs of the fork to strike the outer sides of the jaw-arms and close the said jaws together, but not sufficiently close to come in contact with the box. This slide-bar 59 is lifted by a cam, 60, (see Fig. 7,) on shaft 5, that acts upon a roller-stud, 61.

The pipe $n$, hereinbefore described as connected with the reservoir H', containing compressed air, has joined with it a pipe, 62, which is attached to a valve, 63. (See Fig. 2.) The box being fully covered by the taking-off cap, the cover only of which is in contact with the box, the valve 63 has its stem 64 operated to open the valve and permit the compressed air to pass from the pipe 65 into the opening $e^9$ in the annular block $e^8$, and that into the pipe $u$ of the stem of the former, (see Fig. 12,) and into the former $p$, the air lifting the puppet-valve $w$. The air so admitted passes through the perforations of the former and acts against the interior of the box, expands it sufficiently to remove it from the perforations of the former, and also causes it to contact closely with the interior of the jaws or taking-off cap. This contact of the box against the interior of the taking-off cap expels the air from between the box and cap and causes the box to adhere to the cap as the latter is lifted vertically by the said slide 44 preparatory to being reversed or turned over forward by the action of the sectors, before described, in order that the cap may place the box upon the receiving-bed S. As the yoke 42 is turned backward with the shaft 43 the shaft 44 is reversed, causing the removal of the cover 41 from the jaws, and as the jaws reach a horizontal position in front of the machine over the receiving-bed the yoke is stopped in its movement by the finger 6 striking the projection 67, when the slide 44 is permitted to descend until the jaws touch, or substantially so, the receiving-bed S, when the slide-bar 59 is again lifted until its finger 68 enters between the arm of the jaws, as in Fig. 4, when the jaws are opened, removed from contact with and raised from the box by lifting the slide 44 by the cam 56, the box being left upon the receiving-bed. The rotatory table $t$ is now rotated another step until the former is brought into position to be moved up into the hood 72 by the plunger $e^2$, (see Fig. 16,) elevated by the link 70, (see Fig. 1,) attached to an arm, 71, of the rocker-shaft 34. This plunger $e^2$ has connected with it a pipe, 73, Fig. 1, connected with a forcing-pump, 74, supplied with water through a pipe, 75, in communication with a suitable water-supply. The former, without a box upon it, lifted into the said hood 72, has forced into it a stream of water, it passing into the stem $r$ (see Fig. 12) and up through the ports $a^2$ into the former, where it meets the deflector 76, and is so diverted in its course as to insure the passage of its water over and through all the perforations of the former, effectually cleansing it of any pulp then adhering to it, the said water so entering into the hood 72 passing out through the pipe 77. The cleansed former is now lowered to its level on the sleeve $s$, when the table $t$ is again moved another step, again bringing the former to its first position, to be again lifted into the forming-cylinder to receive a fresh coating of pulp.

Instead of using water from the force-pump 74, I may take it from any source from which it is common to obtain water under pressure, such, for instance, as a hydrant of a water-system. As far as described I have followed but one former about its circuit; but it will be remembered during this time that each of the six formers of the table $t$ is having performed upon it one of the six operations described as entering into the steps requisite to be taken for the formation of the paper box in the best manner, and these six simultaneous operations, performed automatically and in one machine, aggregate all the steps for a complete box, thus economizing the entire time of the machine and causing the most rapid production of boxes.

In order that only the proper amount of pulp be retained in the pulp-receiver for the box to be made, an overflow-gate, 78, is placed in the wall of the pulp-receiver, (see Fig. 11,) and the said gate is rendered adjustable by a gate-adjusting device, 79, (shown as a screw with a milled head,) the overflow taking place into an overflow-chamber, 80, from which, through a pipe, 81, the surplus of pulp is passed back into the pulp-vat. The eccentric H (see also dotted lines, Fig. 8) receives about it the eccentric strap 87, having a rod, 88, forked at its front end. (See Fig. 4, where the fork is shown in full and dotted lines, and in Figs. 7 and 26.) One part, 89, of this fork moves the piston of the pump 74, while the other part, $c^4$, (shown in dotted lines, Fig. 4, and in Figs. 25 and 26,) is connected with an elbow-lever, 91, that at its other end is joined to and acts at the proper time to lift the stem 64 of the air-valve 63, as before described The box in which the dies 14 15 move is covered by the cover 92, having at its top a sleeve, 93, within which slides the box-plunger 27, and about which is closely fitted the collar 19, before described.

The edge of the rotating table $t$ is provided with notches or teeth 94, (see Fig. 13,) that each time the table is to be arrested in its movement meets a stop, 95, surrounded and pressed inward by a spring, 96, the said stop having its bearings in ears of a bracket, 97, attached to the plunger-bed $k^2$. This stop 95 has a finger, 98, which, as the rack $p^2$ is retracted, is acted upon by a projection, 99, thereon, (see Fig. 7,) that draws back the stop, releasing it from the tooth of the table with which it is engaged, permitting the table to be rotated. At one end of each die 14 15 16 17 (see Figs 5 and 6) is placed a gib, $k^3$, made adjustable by one or more screws, $l^3$, to compensate for the wear of the dies.

The different operating parts—such as the walking-beam, actuating-links, the toggle-levers, the connections with the plunger, and the parts for moving the valves and receiving-bed—are all made adjustable in order to adapt the same mechanism to manufacture boxes of different sizes, it being necessary to actually change only the perforated part of the former and the pressing-dies and the taking-off cap.

In Figs. 4 and 7 one of the formers is shown with its outer or finer pervious covering, $c^5$, removed. This covering is struck up to shape by dies, so as to be seamless, and after being brought to shape is bored to form the fine holes.

In Patent No. 84,835 the pulp is used in high column; but the removable cylinders, one for each former, to surround the former and contain the pulp, are of uniform diameter, which necessitates long cylinders.

In the invention herein described it will be noticed that but one forming-cylinder is employed for all the formers, they being raised into the cylinder at the proper time, and to reduce the length of this cylinder and yet retain all the advantages due to the thin pulp the upper portion of the forming-cylinder is enlarged and suitably tapered down to the required diameter at that portion of the cylinder surrounding and immediately above the top of the former. (See Fig. 11.) The lower end of the forming-cylinder, as shown in this figure, has a packing-ring, 100, by which means the flange of the former, when brought in contact with it, makes a packed or water and air tight joint.

In actual use the machine herein described will be operated by power applied by belt and pulley in any usual way.

The slide 44 (see Figs. 21 and 27) is dovetailed or grooved to fit upon and be guided by the guide $c^6$. The slide 44 has a roll, $c^8$, which is struck by the cam 59. The pipes $m^4$ $m^5$ $m^6$ are the outlet-pipes for the pumps.

In Fig. 11 the pipe $c^{10}$, at the left of the vat-valve, is supposed to be in communication with a suitable steam-generator, and the admission of steam into the pulp is controlled by the valves $c^{12}$.

I claim—

1. In a machine for making hollow articles from pulp, a vat-valve to control the flow of pulp from the pulp-vat to the receiving-cylinder and means to operate it intermittingly, combined with the pulp-receiving cylinder and the pulp-controlling valve between them to retain the pulp in the receiver and to permit its discharge therefrom intermittingly into the forming-cylinder.

2. In a machine for making boxes from pulp, the pulp-receiving cylinder and forming-cylinder, combined with an intermediate pulp-controlling valve to permit the intermittent discharge of pulp from the receiving into the forming cylinder, substantially as described.

3. The pulp-receiving and the forming cylinders, combined with the automatically-operated pulp-controlling valve $a$ to permit the discharge of the pulp from the pulp receiving into the forming cylinder, and then to close the opening between said parts, substantially as described.

4. The vat-valve, in communication with a supply of pulp, means to move it intermittingly, and the pulp-receiving cylinder, combined with the forming-cylinder and pulp-controlling valve therein to permit the pulp in the receiving-cylinder to be discharged intermittingly into the forming cylinder, substantially as described.

5. The pulp-receiving cylinder, the forming-cylinder, the pervious former adapted to be placed therein, and the pulp-controlling valve between them, combined with the valve and pipes to introduce compressed air into the forming-cylinder to quickly force the water of the pulp through the pervious former.

6. The forming-cylinder and pulp-controlling valve to close it and the pervious former, combined with the port $o$ and inlet and outlet valves for the compressed air, substantially as described.

7. In a machine for forming hollow articles from pulp, the vat-valve and its connected adjustable slotted link and the pulp-controlling valve, combined with the rocker-shaft $d$ and its arms $h$ $i$ to operate the said valves at the proper times, substantially as described.

8. The rocker-shaft $d$, and the adjustable pitman to operate the arms $h$, $i$, and $e$ on the said shaft, and the link and lever $g$, combined with the vat-valve, the pulp-controlling valve, and the outlet and inlet valves for the compressed air, to operate all substantially as described.

9. In a machine to produce hollow articles from pulp, the forming-cylinder, largest in diameter at its upper end and tapered to join with a cylindrical portion of smaller diameter, combined with a pervious former of less diameter and length than the cylindrical portion of the forming-cylinder, herein described as of least diameter, substantially as and for the purpose set forth.

10. In a machine to produce hollow articles from pulp, a stationary or fixed forming-cylinder with a valve for the admission into the said cylinder of compressed air, a table and means to rotate it intermittingly, a series of pervious formers, and means to successively place the formers and lower portion of the said cylinder in proper contact and relation to enable the formers to successively receive a deposit of pulp, substantially as described.

11. The former provided with the hollow stem $r$, combined with the air-pipe and valve to act as a stop for the same, substantially as and for the purpose described.

12. The pervious former, combined with the deflecting-plate 76, as and for the purpose described.

13. The pervious former, having a hollow stem and outlet, combined with a hollow reciprocating plunger to elevate the said former and make connection between its stem and the plunger to enable water within the former to be delivered out through the plunger, as described.

14. The pervious former and means to elevate it within the space between the compressing-dies, combined with the compressing-dies and means to close them to express the water from and compact the pulp at the sides of the former, substantially as described.

15. In combination, the pervious former, reciprocating side-compressing dies, and the box-plunger and sleeve in which it moves, substantially as described.

16. The box to contain the pressing-dies, and the pressing-dies, combined with the adjustable gibs, as and for the purpose described.

17. The sleeve $q^3$, extended upward above the box in which the pressing-dies move, and the pressing-dies and toggle-levers, combined with the collar and its arms to simultaneously move the said dies, substantially as set forth.

18. The radially-movable series of pressing-dies, recessed, as described, at one side, combined with the toggle-levers and headed connecting-rods $h^3$, as and for the purpose described.

19. In a machine to produce hollow articles from pulp, the combination, with the pervious former and its hollow stem, of a pipe connecting the interior of the former with an exhausting-pump or vacuum-chamber to remove fluid from the inside of the former and box thereon, substantially as described.

20. In a machine to produce hollow articles from pulp, a pervious former, a series of radially-movable pressing-dies, a die-box to contain them, a plunger and sleeve in which it moves, and means to exhaust the water from the interior of the former as it is expressed from the fiber on the former, substantially as described.

21. The pervious former and hood to cover it, combined with a pipe to lead water under pressure to and discharge it within and cleanse the former, substantially as described.

22. The former, the receiving-bed, and the two concaved jaws of the taking-off cap, combined with means to move the jaws into position above the former and then above the bed, and means to lower and raise the said jaws in each of their two positions and open and close them at the stated times to transfer the box from the former to the receiving-bed, substantially as described.

23. The two concaved pivoted jaws of the taking-off cap and their oscillating carrying-shaft, the slide, and means to lower the jaws in position to surround but not to touch the box on the former, combined with the slide and its forked part to close the said jaws together while they surround the former and box, substantially as described.

24. The two pivoted concaved jaws of the taking-off cap, the oscillating shaft 43 to move the said jaws from a position above the former to a position above the receiving-bed, and vice versa, and the bevel-gear carried by the said shaft, combined with the shaft 46, its bevel-gear 55, and cover 44, to operate all substantially as described.

25. The oscillating shaft, the yoke 42, provided with the finger 6, and the two pivoted concaved jaws actuated by the said shaft, combined with mechanism, substantially as described, to oscillate the said shaft, and the slide and its projections 56 67 to check the oscillation of the said shaft and place the jaws in proper horizontal position preparatory to the descent of the slide.

26. In a machine for the manufacture of hollow articles from pulp, the former upon which the box is pressed into shape, its hollow stem, the taking-off cap composed of the two concaved jaws, which, when closed together, do not come into contact with the box, and the cover 41, combined with a valve and pipe to introduce compressed air into the former to expand the box, detach its inner face from the perforations of the former, and place the outside of the box in contact with the concaved jaws, substantially as described.

27. In a machine for making hollow articles from pulp, a taking-off cap to remove the box from the former, a receiving-bed for the hollow articles, and means to move said bed forward intermittingly, as and for the purpose set forth.

28. In a machine for the manufacture of hollow articles from pulp, an intermittingly-rotating table and a series of sleeves thereon, and a series of formers having stems fitted to the said sleeves, combined with the plunger-bed and a series of hollow plungers, and means to reciprocate the plungers at the proper times, as stated, to lift the formers into operative position, substantially as set forth.

29. The combination, in a machine for the manufacture of hollow articles from pulp, of the following instrumentalities—viz., a pulp-receiver, the forming cylinder, a valve located between them, a rotary-table and a series of formers carried by it, means to place the formers successively within the said cylinder, a series of hollow reciprocating plungers and means to automatically place the plungers in connection with the stems of the formers to exhaust the water from the formers, a set of dies to compress the fiber upon the formers, and a taking-off cap and means to operate it at the proper times—the combination being and operating, substantially as described, to automatically form and deliver the said hollow articles, as set forth.

30. That improvement in the art or process of manufacturing articles from paper-pulp wherein the water of the pulp is pressed through the pervious former by compressed air, which consists in heating the pulp before it is delivered into the forming-cylinder about the pervious former, whereby the water of the said pulp as the compressed air is permitted to expand is kept at the proper temperature to flow freely through the fiber of the pulp and the perforations of the former, substantially as and for the purpose set forth.

31. In a machine for making hollow articles from pulp, the pervious former upon which the box is formed and pressed, combined with the separate taking-off cap to remove the hollow article to be dried.

32. The perforated metallic seamless former-shell, substantially as described.

33. In a machine to produce hollow articles from paper-pulp, a stationary forming-cylinder, a pervious former adapted to be placed below the same to receive a coating of pulp, as described, a rotating table and means to remove the former from the forming-cylinder into position between pressing-dies, and pressing-dies and means to move them to compress the hollow article on the said former.

34. The series of formers and their rotating carrying-table, notched at its edges, its supporting-shaft, ratchet, and pawl, combined with the reciprocating rack to move the table intermittingly and a stop to hold the table at rest at the proper time, substantially as described.

35. The pulp-vat, receiving-cylinder, and forming-cylinder, combined with a vat-valve located between the pulp-vat and receiving-cylinder, and with a pulp-controlling valve between the receiving and forming cylinders, substantially as described.

36. The pervious former provided with a hollow stem for the passage of air and water, substantially as and for the purpose described.

37. In a machine to make paper boxes from pulp, a taking-off cap composed of two jaws and a cover, 41, to operate substantially as described.

38. In combination, the hood 72 and means to hold it, the former $p$, the force-pump 74, and a suitable pipe or passage for water from the said pump into the former in the said hood, substantially as described.

39. A paper-box-making machine provided with a suction-pump for withdrawing water from the pulp on the former $p$, and with a force-pump, 74, for clearing the interior of the former, substantially as described.

40. The combination of the sliding bolt 95, provided with a finger, 98, and the teeth 94 upon the circular table $t$, that carries the pervious formers $p$, and with the projection 99 on the rock-bar that rotates the said circular table, substantially as described.

41. That improvement in the art or method of manufacturing hollow articles from pulp which consists in forcing the water from the pulp through a pervious former surrounded by it by means of compressed air, and subsequently pressing the fibrous portion of the pulp so left on the pervious former between the said former and pressing-dies, substantially as described.

In testimony whereof I have signed my name to this specification in the presence of two subscribing witnesses.

WILLIAM J. KEEFE.

Witnesses:
G. W. GREGORY,
L. F. CONNOR.